US010726469B1

(12) United States Patent
Otwell et al.

(10) Patent No.: US 10,726,469 B1
(45) Date of Patent: Jul. 28, 2020

(54) SYSTEMS AND METHODS FOR ADJUSTING ITEM ATTRIBUTE VALUES OF A SELECTED ITEM

(75) Inventors: Andrew H. Otwell, Seattle, WA (US); Sachin Kaushik, Windsor (GB); Jeremy S. Haynes, Seattle, WA (US); Arjun Chittoor, Redmond, WA (US); Gilia N. Angell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1295 days.

(21) Appl. No.: 12/986,063

(22) Filed: Jan. 6, 2011

(51) Int. Cl.
*G06Q 30/06* (2012.01)

(52) U.S. Cl.
CPC ..... *G06Q 30/0633* (2013.01); *G06Q 30/0621* (2013.01); *G06Q 30/0641* (2013.01)

(58) Field of Classification Search
CPC .... G06C 30/06–30/0645; G06C 30/08; G06Q 30/06–30/0645; G06Q 30/08
USPC .................................................. 705/26–27.2
See application file for complete search history.

(56) References Cited

U.S. PATENT DOCUMENTS

| | | | |
|---|---|---|---|
| 5,592,378 A * | 1/1997 | Cameron et al. | .......... 705/26.62 |
| 6,115,717 A | 9/2000 | Mehrotra et al. | |
| 6,731,309 B1 | 5/2004 | Unbedacht et al. | |
| 7,016,865 B1 | 3/2006 | Weber et al. | |
| 7,127,414 B1 | 10/2006 | Awadallah et al. | |
| 7,203,675 B1 | 4/2007 | Papierniak et al. | |
| 7,266,514 B2 | 9/2007 | Herbert et al. | |
| 7,331,038 B1 | 2/2008 | Snodgrass et al. | |
| 7,460,735 B1 | 12/2008 | Rowley et al. | |
| 7,856,380 B1 | 12/2010 | Latin-Stoermer et al. | |
| 7,945,484 B1 | 5/2011 | Tam et al. | |
| 9,269,157 B2 * | 2/2016 | Saban | ....................... G02B 5/08 |
| 2004/0143600 A1 | 7/2004 | Musgrove et al. | |
| 2005/0071242 A1 | 3/2005 | Allen et al. | |
| 2006/0293970 A1 * | 12/2006 | Haynes et al. | ................... 705/26 |
| 2007/0168391 A1 | 7/2007 | Coschigano et al. | |
| 2007/0168517 A1 | 7/2007 | Weller | |
| 2008/0154747 A1 | 6/2008 | Tarbell et al. | |

(Continued)

OTHER PUBLICATIONS

Renaud, "Everyone Abandons—Eventually: Understanding the Online Shopping Experience," 2009 IEEE Conference on Commerce and Enterprise Computing, Jul. 1, 2009, pp. 245-251. (Year: 2009).*

(Continued)

*Primary Examiner* — Adam L Levine
(74) *Attorney, Agent, or Firm* — Knobbe, Martens, Olson & Bear, LLP

(57) ABSTRACT

Systems and methods are provided for adjusting item attribute values of an item. Aspects of the present disclosure may present for display item information associated with an item, where the item information includes one or more item attributes that are each associated with an item attribute value. A selection of the item may be received, where the selection of the item corresponds to a user request to add the item to an order. At least one of the item attribute values associated with the item may be selected by the user. After the item is added to the order, item information associated with each of the items of the order may be displayed, where the displayed item information associated with the item includes a selectable option for changing an item attribute value associated with the item of the order from within the displayed item information.

12 Claims, 10 Drawing Sheets

(56) References Cited

U.S. PATENT DOCUMENTS

2008/0177639 A1 7/2008 Kuppersmith et al.
2009/0007012 A1 1/2009 Mandic et al.

OTHER PUBLICATIONS

U.S. Appl. No. 10/720,712, filed Nov. 24, 2003, by Green, entitled "Deferred and Off-Loaded Rendering of Selected Portions of Web Pages to Incorporate Late-Arriving Service Data".
Endless.com, Endless Shoes & Handbags, http://www.endless.com . . . [accessed Jan. 1, 2009], copyright 2006-2009, 3 pages.
Website for Gap Inc.—http://www.gap.com—Screen shot captured Dec. 19, 2010.

\* cited by examiner

SYSTEMS AND METHODS FOR ADJUSTING ITEM ATTRIBUTE VALUES OF A SELECTED ITEM

BACKGROUND

Electronic commerce has become a popular method for conducting business and selling items (such as goods or services) to customers. In many electronic commerce systems, information about items offered for sale or lease is provided to potential customers through a user interface accessible via an electronic network. The information provided by such systems is generally chosen to include information that would be of interest to potential customers. Such information may include, for example, an offering price for the item, features of the item, information regarding a particular merchant or seller offering the item, shipping information for the item, and customer reviews for the item.

In some instances, an electronic commerce system may offer multiple variations of the same or similar item. A particular type of women's shoes, for example, may be available for purchase in different sizes, colors, materials and/or styles. In addition, a particular item may be offered for sale or lease by more than one seller or merchant. To accommodate such variation, some electronic commerce systems may provide, in addition to information about a particular item, a user interface that allows a user to select attribute values for one or more attributes of the item prior to either selecting the item for purchase or adding the item to an electronic shopping cart. In such systems, however, once the user has selected a given set of attribute values for an item and added the configured item to a shopping cart or an order, the system typically does not allow the user to modify the item's attribute values prior to purchase or shipment of the order without removing the previously configured item from the shopping cart or order, and/or adding a newly configured item to the shopping cart or order. In such systems, the selected item attribute values of an item essentially become static or immutable once the item is added to the shopping cart or order.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
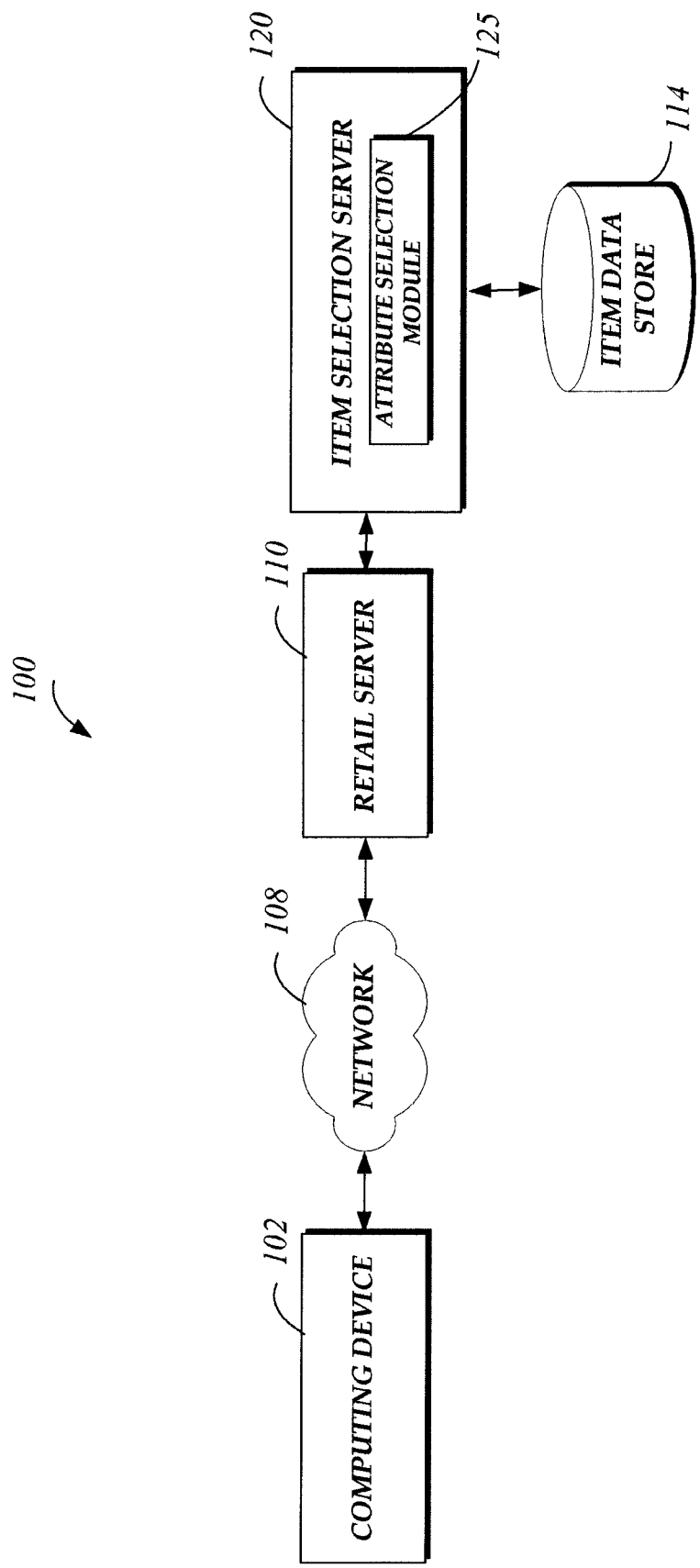
FIG. 1 is a block diagram depicting an illustrative operating environment including a retail server and an item selection server for enabling a user to select items to be added to a shopping cart or an order, and enabling the user to modify attribute values associated with the selected items.

Generally described, aspects of the present disclosure relate to enabling a user to adjust or modify attributes of an item after adding the item to a shopping cart, after adding the item to an order, and/or after otherwise selecting the item for purchase or potential purchase. In some embodiments, aspects of the present disclosure enable the user to adjust or modify an item attribute value associated with an item attribute of an item in an electronic shopping cart or an order from within a user interface presenting the items of the shopping cart or order. Accordingly, the user may adjust the attribute values of an item without removing the item as previously configured from the shopping cart or order.

For example, if a user has added a pair of tennis shoes to an electronic shopping cart for later purchase, aspects of the present disclosure enable the user to view the items in the user's shopping cart and edit item attributes associated with the tennis shoes and/or other items in the shopping cart from within a user interface that displays the contents of the shopping cart. Accordingly, in some embodiments, if the user had previously selected the color "brown" and size "11" for the tennis shoes before adding the shoes to a shopping cart, aspects of the present disclosure enable the user to switch the color and/or size selections from within a user interface that presents the contents of the shopping cart. The color and/or size attribute value changes made by the user may cause the user interface to be selectively updated based on the selected attribute value changes. According to some embodiments, changes to item attributes may additionally or alternatively be made in one or more user interfaces that present the items of an order that has yet to be finalized by the user, and/or one or more user interfaces that present the items of an open order that has been finalized by the user but not yet shipped by a retailer or seller.

In some embodiments, an item selection server as disclosed herein may be used to adjust item attribute values of an item selected for purchase. The item selection server may present for display item information associated with an item available for purchase, where the item information includes one or more item attributes. Each item attribute may be associated with one or more selectable item attribute values. The item selection server may receive a selection of the item, where the selection of the item corresponds to a user request to add the item to an order of one or more items to be purchased. In some embodiments, at least one item attribute associated with the item may be associated with an item attribute value selected by the user. The item selection server may then add the item to the order. After adding the item to the order, the item selection server may receive a request to view information associated with the items of the order. In response to the request, the item selection server may present for display item information associated with each of the one or more items of the order, where the displayed item information associated with at least one item of the order includes a selectable option or control for changing an item attribute value associated with the item from within the displayed item information. In some embodiments, the user can change an item attribute value associated with the item without removing the item from the order, and without refreshing the user interface.

The illustrative operating environment shown in FIG. 1 includes a system 100 in which users may place orders for one or more items. The system 100 may include an item selection server 120 that includes an attribute selection module 125 for generating a user interface that enables a user to adjust item attribute values associated with selected items from within a user's shopping cart or order. The environment also includes a retail server 110 that facilitates electronic browsing and purchasing of goods and services using various user devices, such as computing device 102. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, tablet, and the like. The item selection server 120, which will be described below in more detail, may be connected to or in communication with an item data store 114 that stores information associated with items available for purchase through retail server 110, and/or items for which information is available to users, but which are not currently available to be ordered. In some embodiments, "purchasing" an item may include physically obtaining the item, downloading an electronic version of the item, renting or leasing a copy of the item, and/or providing streaming access to the item. Item data stored in item data store 114 may include any information related to an item that may be of interest to a user or may be useful for classifying the item. For example, item data may include, but is not limited to, price, availability, title, item identifier, item feedback (e.g., user reviews, ratings, etc.), item image, item description, item attributes, tags associated with the item, etc.

The item attribute data associated with an item in item data store 114 may include both item attributes and item attribute values, where each item attribute may be associated with one or more potential attribute values that represent different variations of the item. The item attributes stored for a given item may depend on the type of item or a category associated with the item. Example item attributes for a given item, such as a shirt, may include "Color," "Size," "Fabric Type," etc. An item attribute value is a value associated with a given item attribute. For example, the "Size" item attribute for a given item, such as a shirt, may have associated item attribute value options of "Small," "Medium," and "Large." In this example, a user that is interested in purchasing the shirt may then select from among the available item attribute values a desired attribute value for the "Size" attribute. In some embodiments, the item data store 114 may additionally store, for each item, information regarding the availability of the item, such as the attribute values for each variation of the item that is actually in inventory or otherwise available to be purchased by a customer. For example, the item data store 114 may include item attribute information indicating that a given shirt is generally produced in three different sizes, "Small," "Medium," and "Large," but is only currently available to be ordered in size "Medium."

As indicated above, the item data store 114 may include information on items available from a plurality of merchants or sellers (as opposed to storing information for only a single vendor). In certain embodiments, the retail server 110 may also access item data from other data sources, either internal or external to system 100. Accordingly, the retail server 110 may obtain item information for items offered for sale by a plurality of sellers. A user may then add items to a shopping cart from a plurality of sellers, and/or purchase items from a plurality of sellers in a single transaction or order placed with the retail server 110. In other embodiments, the user may purchase items from a single vendor in a single transaction or order placed with the retail server 110.

In different embodiments, item data store 114 may be local to item selection server 120, may be local to retail server 110, may be remote from both item selection server 120 and retail server 110, and/or may be a network-based service itself. In the environment shown in FIG. 1, a user of the system 100 may utilize computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and peer-to-peer network configurations to implement at least a portion of the processes.

In brief, the retail server 110 is generally responsible for providing front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services (referred to herein as "items") from one or more data stores (not illustrated), as is done in conventional electronic commerce systems. In certain embodiments, the retail server 110 may also access item data from other data sources, either internal or external to system 100.

Figure 2:
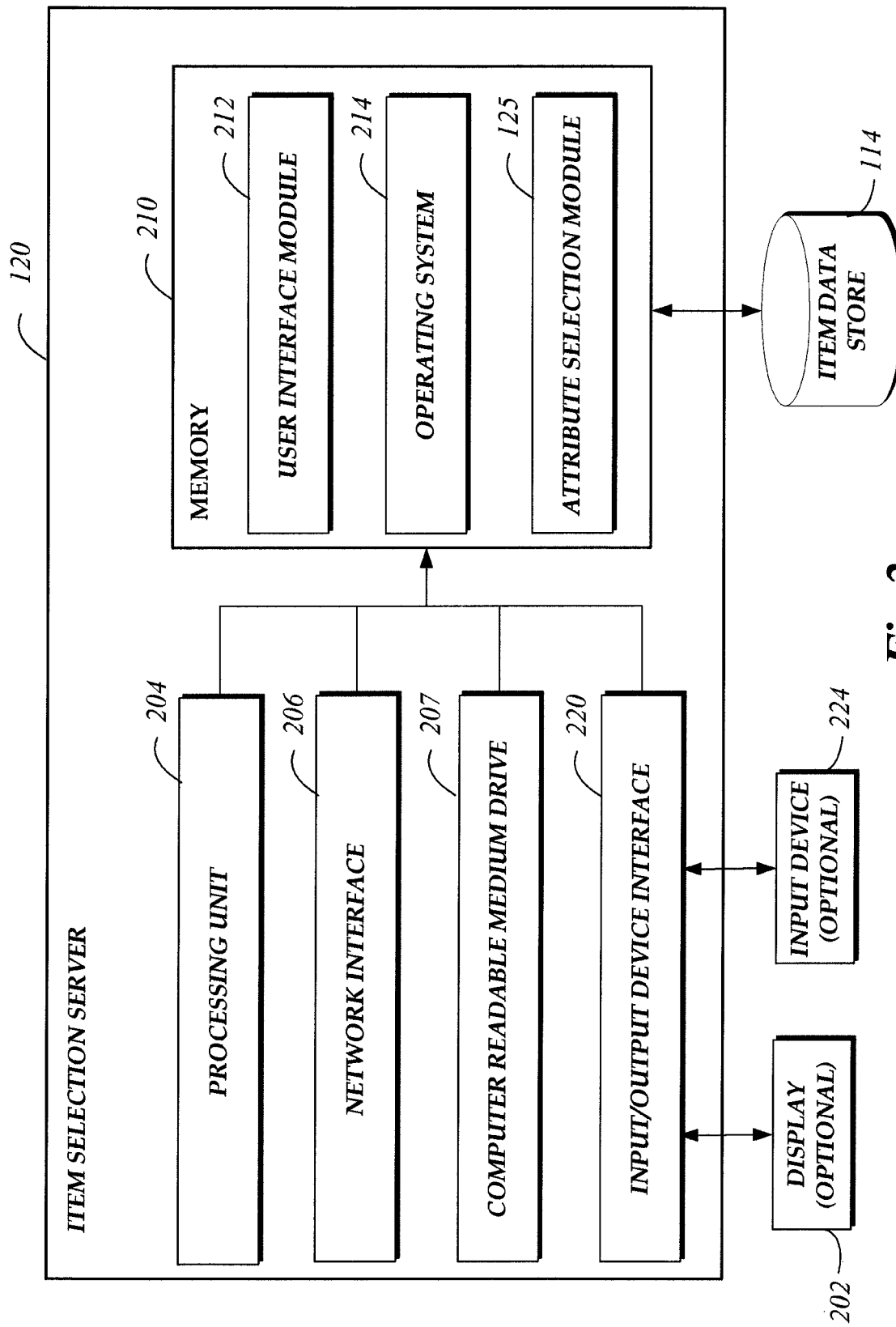
FIG. 2 depicts an example of a general architecture of an item selection server for enabling a user to select items and item attribute values, including an attribute selection module for generating a user interface that enables a user to adjust item attribute values associated with selected items.

FIG. 2 depicts an example of a general architecture of an item selection server 120 for enabling a user to select items and item attribute values associated with the selected items. The general architecture of the item selection server 120 depicted in FIG. 2 includes an arrangement of computer hardware and software components that may be used to implement aspects of the present disclosure. The item selection server 120 may include many more (or fewer) components than those shown in FIG. 2. It is not necessary, however, that all of these generally conventional components be shown in order to provide an enabling disclosure. As illustrated, the item selection server 120 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc.

The memory 210 contains computer program instructions that the processing unit 204 executes in order to implement one or more embodiments. The memory 210 generally includes RAM, ROM and/or other persistent or non-transitory memory. The memory 210 may store an operating system 214 that provides computer program instructions for use by the processing unit 204 in the general administration and operation of the item selection server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with one or more auxiliary data stores, such as item data store 114.

In addition to the user interface module 212, the memory 210 may include an attribute selection module 125 that may be executed by the processing unit 204. In one embodiment, the attribute selection module 125 implements various aspects of the present disclosure, e.g., generating a user interface that enables a user to adjust item attribute values associated with items, as described further below. While the attribute selection module 125 is shown in FIG. 2 as part of the item selection server 120, in other embodiments, all or a portion of an attribute selection module may be a part of the retail server 110. For example, in certain embodiments of the present disclosure, the retail server 110 may include several components that operate similarly to the components illustrated as part of the item selection server 120, including a user interface module, attribute selection module, processing unit, computer readable medium drive, etc. In such embodiments, the retail server 110 may communicate with an item data store, such as item data store 114, and the item selection server 120 may not be needed in certain embodiments.

Figure 3:
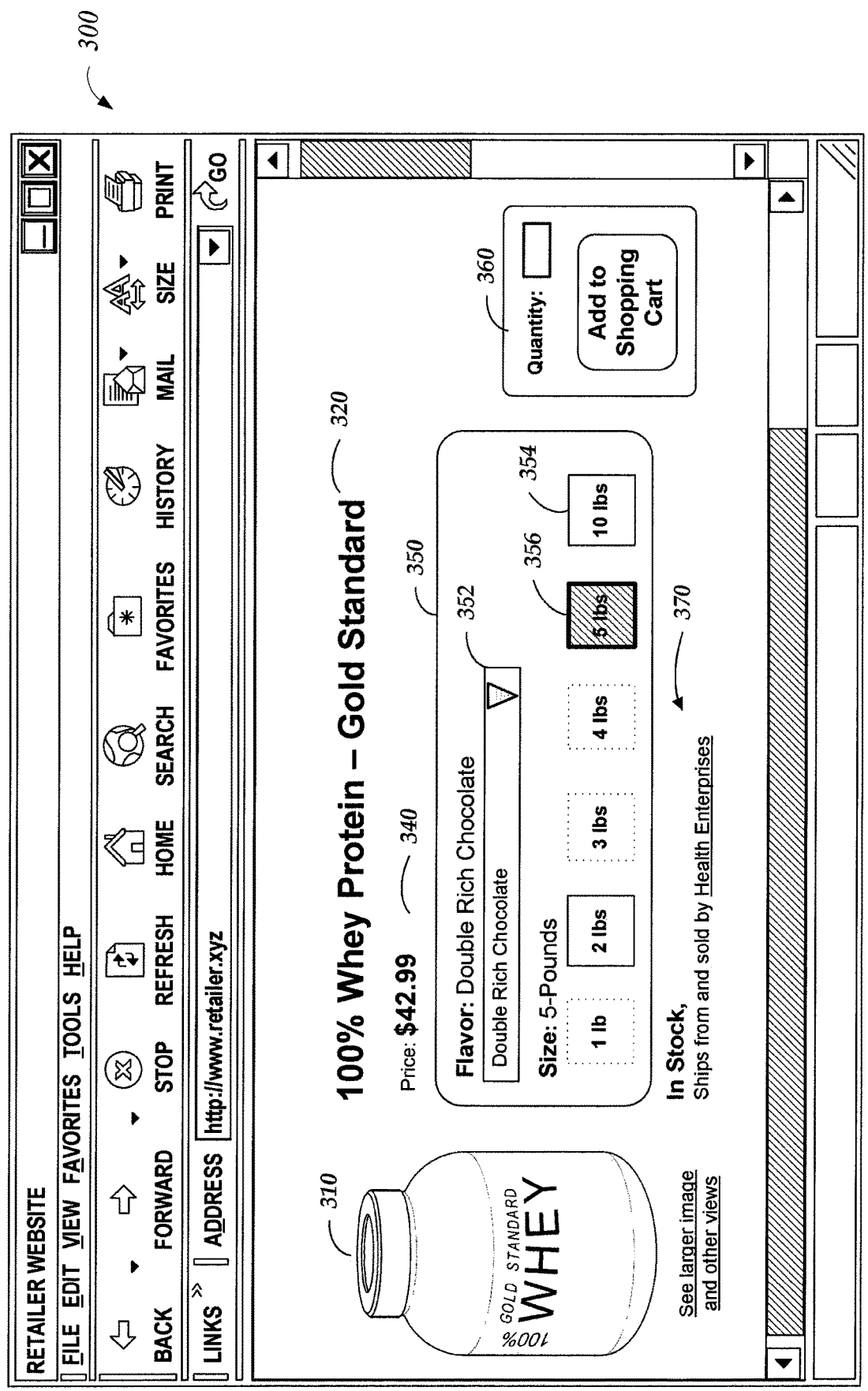
FIG. 3 is an illustrative user interface generated by the item selection server and/or retail server that includes item attribute information received from or generated by the item selection server.

FIG. 3 is an illustrative user interface 300 generated by the item selection server 120 and/or retail server 110 that includes item attribute information received from or generated by the item selection server 120. As shown, the user interface 300 is displayed via a browser operating upon a computing device, such as computing device 102, utilized by a user. In the illustrated example, the user interface 300 may be considered an item detail page for item 320, "100% Whey Protein—Gold Standard." User interface 300 includes an image 310 associated with the item, a price 340 at which the item may be purchased, and a display field 370 presenting information on the availability of the item at the supplier or merchant, "Health Enterprises."

In the illustrated example, the user interface 300 includes item attribute selection options 350 with two selectable item attributes: (1) the flavor of the whey protein, and (2) the size of the container. For example, a user may select flavor selection option or control 352, presented as a pull-down menu, in order to select an item attribute value for a "flavor" item attribute associated with item 320. In this example, the current item attribute value associated with the selectable "flavor" item attribute is "Double Rich Chocolate" (as shown by the text visible in selectable option 352). The current item attribute value associated with the selectable "size" item attribute is "5 lbs," as indicated by the bold and shaded appearance of the "5 lbs" selectable option 356. A user may switch or adjust the item attribute value associated with the "size" attribute by selecting, for example, the "10 lbs" selectable option 354, resulting in selection of a different variation of the subject item 320. User selection of a different variation of the item, such as by selection of a different item attribute value for the flavor and/or size attributes, may cause the item selection server 120 and/or retail server 110 to selectively update one or more portions of user interface 300, such as item image 310, price 340, and/or seller information 370.

The phrase "selectable item attributes" as used herein is intended to refer broadly to features of an item of interest that may be changed by a user to create a new variation of the item. In some embodiments, the quantity of an item included in a shopping cart or an order may not be considered an item attribute because changing the quantity of an item in an order changes an aspect of the order, but does not create a new variation of the item. The selection tools that allow a user to change the selectable attributes may include any tool or user interface control capable of accepting a selection, including dropdown lists, popup menus, selectable buttons, radio buttons, toggle buttons, check boxes, slide bars, text entry windows, scroll bars, spinners, grid views, tree views, palette windows, voice-activated tools, touch-sensitive screens, and the like. Portions of a user interface, such as user interface 300, may be selectively updated when new item attribute values are selected by a user. A user interface that includes selectable item attributes associated with an item may be generated and selectively updated in a variety of ways, such as by the systems and methods disclosed in related co-owned and co-pending U.S. patent application Ser. No. 12/260,951, entitled "SELECTIVE UPDATING OF INFORMATION RESPONSIVE TO ITEM ATTRIBUTE SELECTION EVENTS," filed Oct. 29, 2008, and U.S. patent application Ser. No. 11/617,998, entitled "METHODS AND SYSTEMS FOR SELECTING ITEM VARIATIONS FOR DISPLAY IN USER INTERFACES," filed Dec. 29, 2006, both of which are incorporated herein by reference in their entirety.

The item detail user interface 300 shown in FIG. 3 also provides information about the subject item that is static, and that is not updated when new item attributes are selected. For example, the user interface 300 includes a field for the item name 320 that (in this embodiment) remains the same ("100% Whey Protein—Gold Standard") regardless of which flavor and size are selected by the user using the selection options 350. Likewise, the item detail user interface 300 includes a shopping cart utility 360 that provides the user with the ability to add the item to an electronic shopping cart. In some embodiments, an electronic shopping cart associated with a user and/or browsing session may contain or reference one or more items that the user has expressed interest in purchasing and/or for which the user has initiated an order process. For example, a user may add an item to a shopping cart when the user plans to purchase the item, either on its own or in an order that includes one or more additional items previously or subsequently added to the shopping cart. Various examples of a shopping cart order process are described in more detail below.

Figure 4:
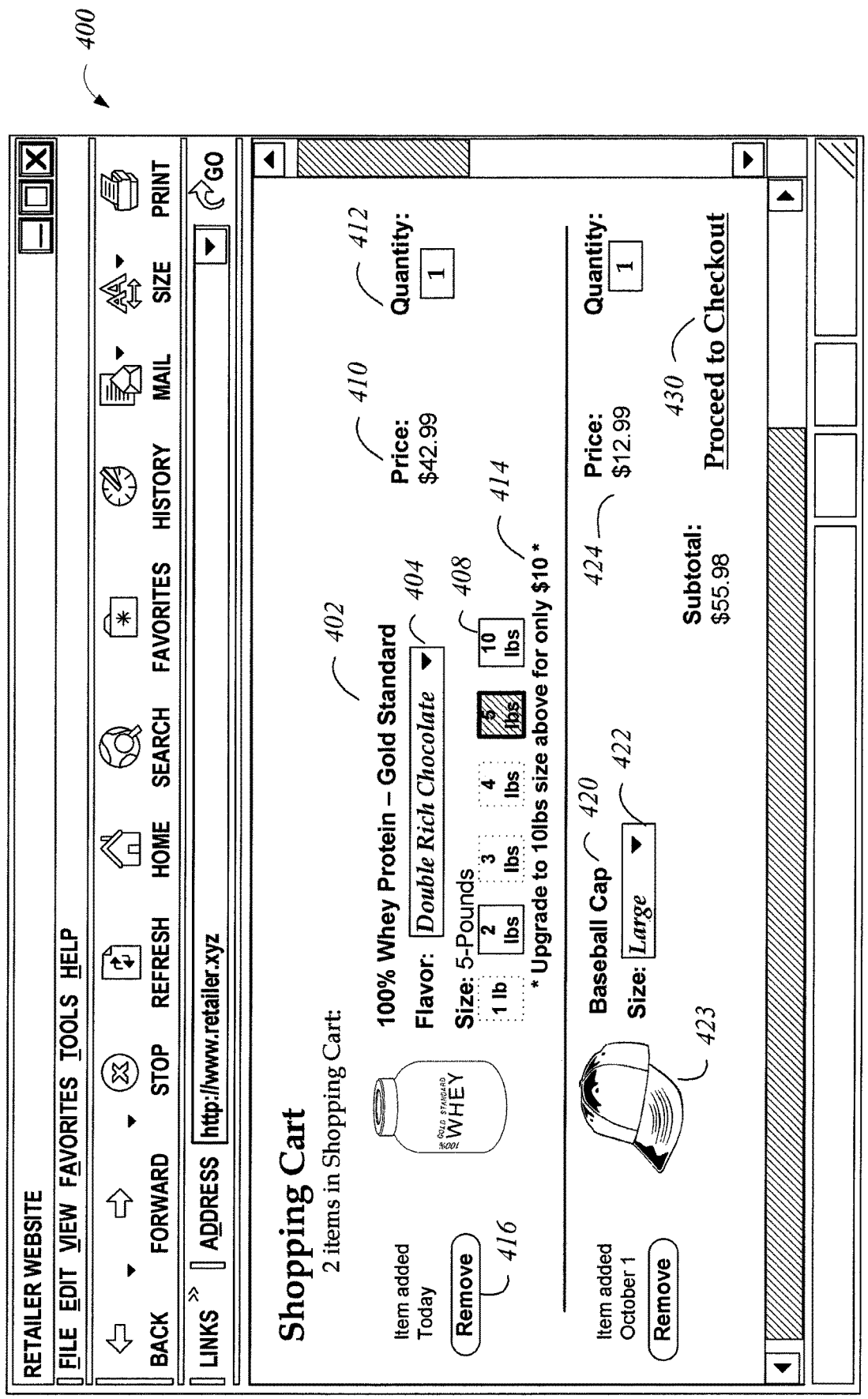
FIG. 4 is an illustrative user interface generated by the item selection server and/or retail server that includes items contained in an electronic shopping cart, including item attribute information received from or generated by the item selection server.

FIG. 4 is an illustrative user interface 400 generated by the item selection server 120 and/or retail server 110 that includes items 402 and 420 contained in an electronic shopping cart, including item attribute information received from or generated by the item selection server 120. The illustrated user interface 400 may be presented to the user after the user has added the "100% Whey Protein—Gold Standard" item to the user's shopping cart, such as by selecting shopping cart utility 360 presented in FIG. 3. In the illustrated embodiment, the most recent addition to the shopping cart (item 402, "100% Whey Protein—Gold Standard") is displayed with selectable attribute option 404 for changing the attribute value for the "flavor" attribute (currently selected as "Double Rich Chocolate," which the user may have previously selected prior to adding the item to the shopping cart) and selectable options for changing the attribute value of the "size" attribute, such as by selection of selectable option 408. The shopping cart includes option 416 to remove item 402 from the shopping cart, a display of the price 410 of item 402, and a selectable quantity option 412, which may be modified by the user in order to change the quantity of item 402 in the shopping cart. The illustrative user interface includes a text field 414 that reads "Upgrade to 10 lbs size above for only $10." Text field 414 may be considered an upgrade or up-sell message, and may be generated by the item selection server 120 based on one or more price comparisons of different variations of the item, relationships of the item to similar items, upgrades made by other customers or purchasers of the item, and/or preset upgrade offers stored in item data store 114.

The shopping cart displayed in user interface 400 also contains a preexisting item 420 that the user has previously added to the shopping cart prior to adding item 402. The "Baseball Cap" item 420 is associated with a "size" item attribute, currently set as the item attribute value "Large," as indicated by the text in selectable option 422. In some embodiments, the user may select size option 422 in order to change the size of item 420 in the shopping cart without removing the item from the shopping cart or otherwise navigating to a different user interface. For example, when the user selects option 422, a menu may be displayed that includes selectable text for each item attribute value associated with the "size" item attribute of item 420 in item data store 114. In some embodiments, the selectable sizes may be restricted to only those sizes that are actually in stock or otherwise available to be shipped to a customer. In other embodiments, the user may be presented with each size in which an item is manufactured, with a note or other visual indication that certain sizes are currently out of stock or not immediately available for shipment. As discussed above in reference to FIG. 3, the selectable options for changing attribute values may be presented in a variety of formats other than the buttons and pull-down menus presented in user interface 400. User selection of a different item attribute value for the "size" attribute of item 420 may result in the item selection server 120 selectively updating portions of user interface 400, such as the image 423 and/or price 424, if a different image, price or other item data is associated with the modified size attribute value in item data store 114. If the user is ready to continue the order process to purchase the items in the shopping cart, as currently configured with selected item attribute values, the user may select "Proceed to Checkout" text 430.

Figure 5:
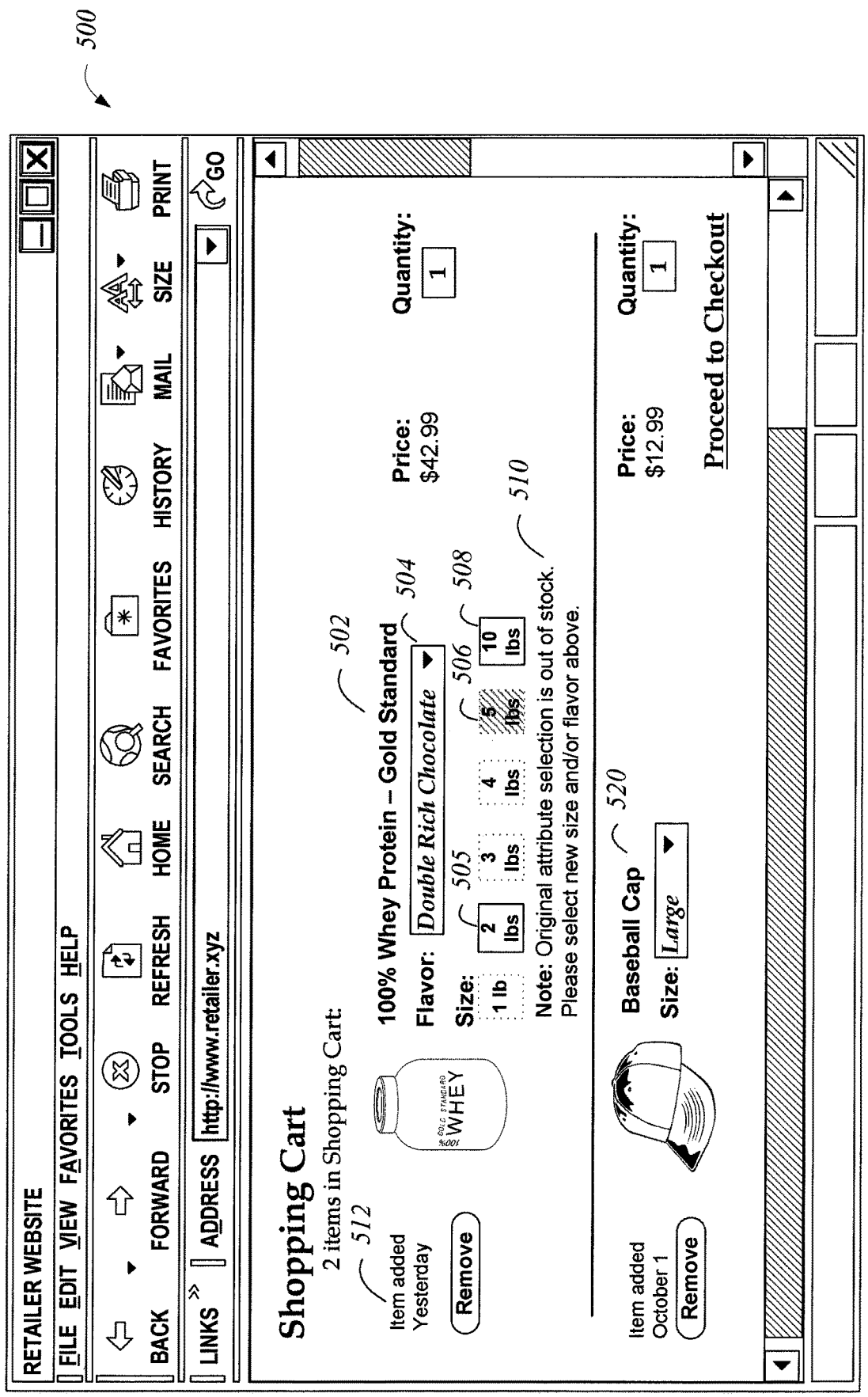
FIG. 5 is an illustrative user interface generated by the item selection server and/or retail server that includes items contained in an electronic shopping cart, where an item as previously configured by the user is no longer in stock.

FIG. 5 is an illustrative user interface 500 generated by the item selection server 120 and/or retail server 110 that includes items 502 and 520 contained in an electronic shopping cart, where item 502 as previously configured by the user is no longer in stock. The illustrated user interface 500 may be presented to the user, for example, when the user requests to view the contents of the user's shopping cart a day after adding item 502 to the shopping cart (as indicated by text 512, reading "Item added Yesterday.") The item selection server 120 may have determined, based on item availability data in item data store 114, that the "5 lbs" size, "Double Rich Chocolate" flavor of the "100% Whey Protein—Gold Standard" item 502 is no longer in stock. For example, another user may have purchased one or more of item 502 with the same attribute value selections sometime between the time that the current user added the item to his shopping cart and the time that the current user requested to view the contents of the shopping cart in user interface 500. The illustrative user interface 500 includes text 510 alerting the user that the original attribute selection is out of stock, and instructing the user to select a new size and/or flavor attribute value from the selectable attribute options presented for item 502. The selectable attribute options include flavor option 504. The user may select option 504 in order to view selectable attribute values for the flavor attribute and switch to a flavor that is currently in stock or otherwise available for purchase. In some embodiments, the displayed flavor options in pull-down menu 504 may be restricted to or indicate the flavor options that are currently in stock in the "5 lbs" size that the user previously selected. If the user instead wishes to keep the "Double Rich Chocolate" flavor attribute value, the user may select a new "size" attribute value, such as "2 lbs" size option 505 or "10 lbs" size option 508. The appearance of the "5 lbs" option 506 (as well as the "1 lb," "3 lbs," and "4 lbs" options) as a dotted box may indicate that the given size attribute value is not available for the selected flavor attribute value ("Double Rich Chocolate").

Figure 6:
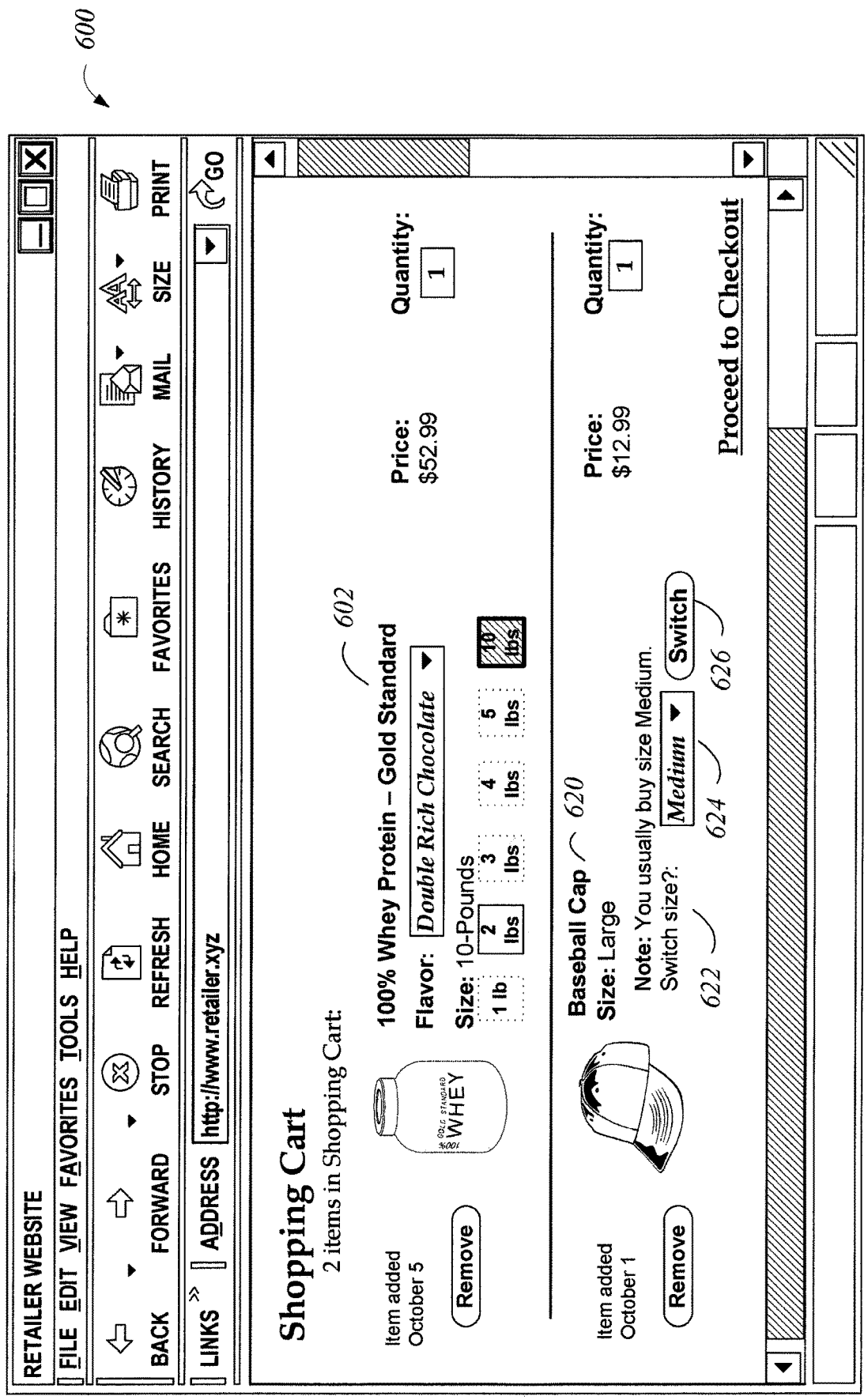
FIG. 6 is an illustrative user interface generated by the item selection server and/or retail server that includes items contained in an electronic shopping cart, where the item selection server has determined that an item has been configured by the user with an item attribute value that differs from the user's typical attribute value selections.

FIG. 6 is an illustrative user interface 600 generated by the item selection server 120 and/or retail server 110 that includes items 602 and 620 contained in an electronic shopping cart, where the item selection server 120 has determined that item 620 has been configured by the user with an item attribute value that differs from the user's typical attribute value selections. The illustrated user interface 600 may be presented to the user as a result of the user's request to view the contents of his shopping cart. Alternatively, user interface 600 may be presented to the user after the user has selected the "10 lbs" size option presented in either user interface 400 of FIG. 4 (where the "10 lbs" size option was presented as an upgrade) or user interface 500 of FIG. 5 (where the "10 lbs" size option was presented as a substitution for a size selection that was no longer in stock).

As illustrated, user interface 600 indicates that "Baseball Cap" item 620 has been added to the shopping cart by the user with a "size" attribute value of "Large." The user interface 600 also includes text 622 which reads "Note: You usually buy size Medium," and providing an option 624 for the user to switch or adjust the attribute value for the "size" attribute to "medium," or another value selected from menu 624, by selecting the "switch" option 626. Text 622 may be generated by item selection server 120, for example, in response to the item selection server determining that the user has previously purchased one or more "medium" sized items associated with the same item category that is associated with item 620 (which may be, for example, "clothing," "hats," "baseball caps," etc.), and/or that the user has indicated a user preference for "medium" sized items in a category associated with item 620. The determination may be made by the item selection server based on customer purchase data and/or user preference data in one or more data stores, such as item data store 114.

Figure 7:
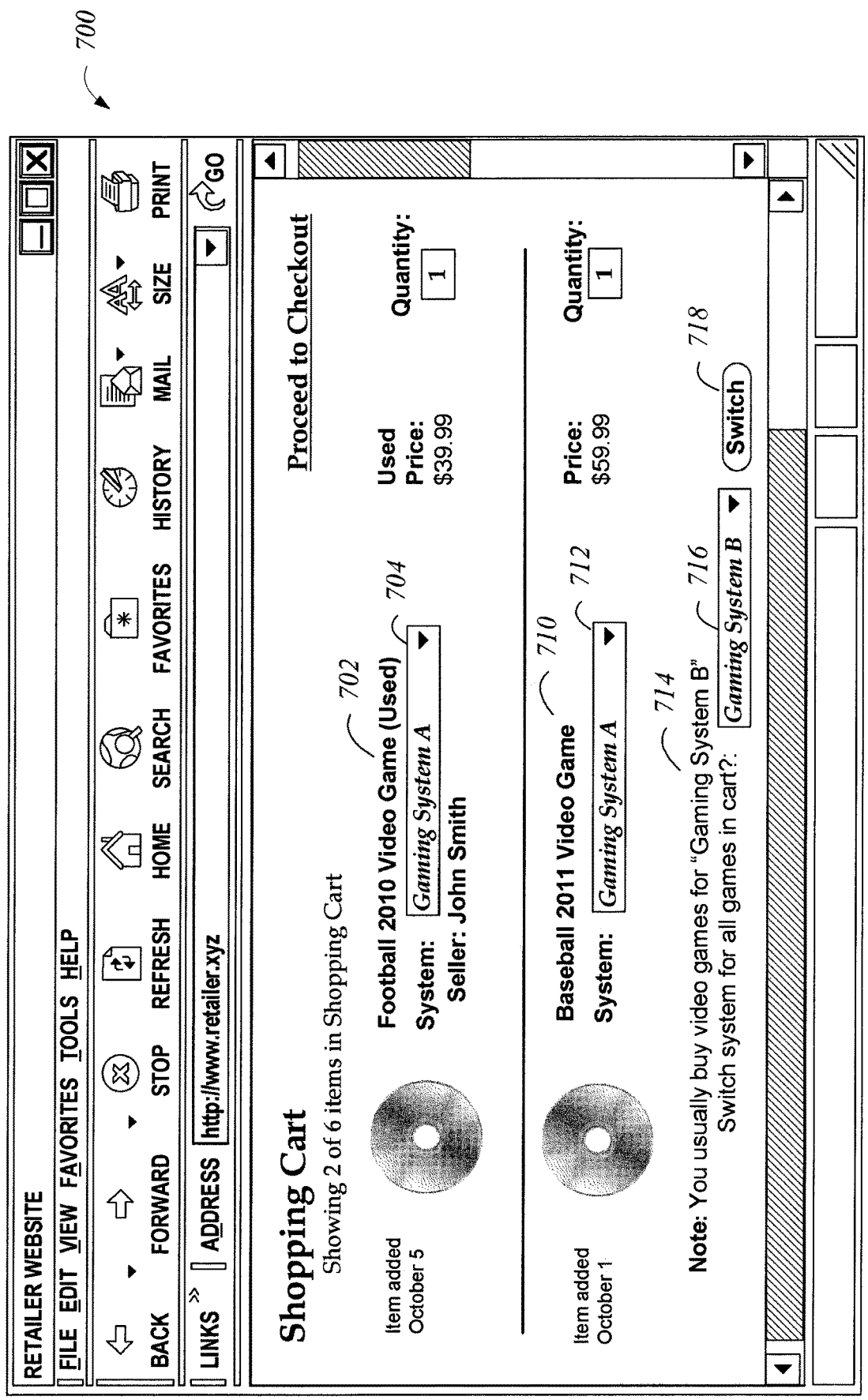
FIG. 7 is an illustrative user interface generated by the item selection server and/or retail server that includes items contained in an electronic shopping cart, where the item selection server has determined that multiple items in the shopping cart have been configured by the user with an item attribute value that differs from the user's typical attribute value selections.

FIG. 7 is an illustrative user interface 700 generated by the item selection server 120 and/or retail server 110 that includes items contained in an electronic shopping cart, where the item selection server 120 has determined that multiple items in the shopping cart have been configured by the user with an item attribute value that differs from the user's typical attribute value selections. As illustrated, user interface 700 displays two items (items 702 and 710) of six items currently in the user's shopping cart. Items 702 and 710 are each video games which the user has added to his shopping cart with a "system" item attribute value of "Gaming System A," as indicated by the displayed text in selectable options 704 and 712. As illustrated, item 702 is a used copy of the item "Football 2010 Video Game," which is available from an individual seller or merchant, "John Smith." The illustrative user interface 700 includes text 714 which reads "Note: You usually buy video games for 'Gaming System B,'" and provides an option 716 for the user to switch or adjust the attribute value for the "system" attribute of both items 702 and 710 (as well as any other video game items in the shopping cart) to "Gaming System B," or another value selected from menu 716, by selecting the "switch" option 718. In this manner, the user may switch an attribute value that is in common among two or more items in a shopping cart with a single "switch" option 718 presented from within a shopping cart display. Similar to the "switch" option discussed above in reference to FIG. 6, text 714 may be generated by item selection server 120, for example, in response to the item selection server determining that the user has previously purchased one or more video games or other items associated with the "Gaming System B" system, and/or that the user has indicated a user preference for "Gaming System B" as a preferred video game system.

While FIG. 7 is presented as an example of a single "switch" option 718 being presented for multiple items as a result of the user's purchase history or preferences, it will be appreciated that similar functionality may be presented in a variety of circumstances. For example, an aggregated "switch" option similar to options 716 and 718 may be presented for any set of two or more items in a shopping cart or order which share a common attribute value, whether or not the item selection server 120 determines that the user has previously indicated a preference for a different attribute value than that currently chosen for the items in the shopping cart. For example, if a user typically buys size "Medium" sweaters, and currently has three "Medium" sized sweaters in his shopping cart, the user may nonetheless desire to switch the size attribute value of all three sweaters to size "Small" if, for example, the user is purchasing the items as a gift for someone who recently informed the user that he or she wears a different size sweater than the user previously selected.

Figure 8:
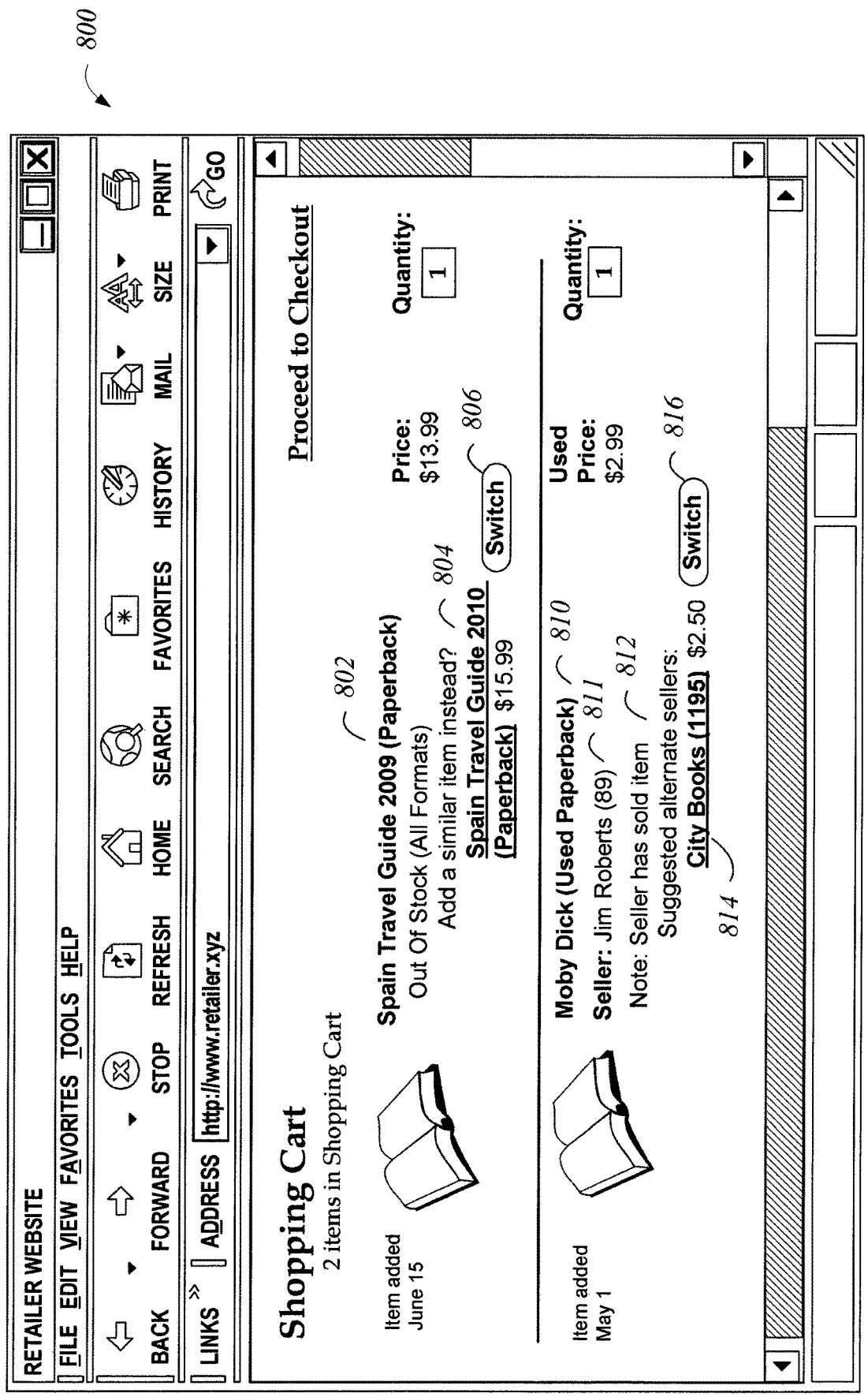
FIG. 8 is an illustrative user interface generated by the item selection server and/or retail server that includes items contained in an electronic shopping cart, where the item selection server has determined that one item is no longer in stock and that another item is no longer available from a seller previously selected by the user.

FIG. 8 is an illustrative user interface 800 generated by the item selection server 120 and/or retail server 110 that includes items 802 and 810 contained in an electronic shopping cart, where the item selection server 120 has determined that item 802 is no longer in stock and that item 810 is no longer available from a seller previously selected by the user. As illustrated, the item selection server has determined that item 802, a paperback book, is no longer in stock or available to be ordered. In response to the determination that item 802 is unavailable, the item selection server has determined a similar item 804. The similar item 804 may have been determined by the item selection server, for example, based on purchase histories of customers, viewing or browsing sessions of users, and/or predetermined item associations stored in item data store 114. The user may select the text displaying the title of similar item 804 in order to view additional information about the item, such as a description, reviews, images, etc. If the user wishes to switch the out of stock item 802 with the similar item 804, the user may simply select the "switch" option 806. In this manner, the user is able to switch the contents of the shopping cart to replace the out of stock item 802 from within the shopping cart display of user interface 800 without first removing item 802 from the shopping cart or performing searches for a similar item.

The shopping cart view illustrated in user interface 800 additionally includes item 810, a used paperback book for sale by seller 811, "Jim Roberts." As discussed above, in some embodiments, a given item may be available from a variety of sellers or merchants that each offer items for sale through retail server 110. In some embodiments, a seller of an item may be treated by the item selection server 120 as an attribute of an item, where a specific seller of an item (such as "Jim Roberts") is considered an attribute value of a "seller" item attribute. In this manner, many of the item attribute selection options described herein may be applicable to the selection of a seller or merchant associated with an item. In other embodiments, the seller of an item may be switched in a manner similar to an item attribute, but may not be considered to be an item attribute. As indicated by the text 811 displaying "Jim Roberts (89)," the seller may have a user feedback score of 89, which may indicate that the seller indentified as "Jim Roberts" has previously received positive feedback from 89 customers. The positive feedback score may have been a reason that the user chose "Jim Roberts" as the seller for item 810 prior to adding item 810 to the user's shopping cart. As indicated by text 812, the item selection server 120 has determined that item 810 is no longer available from seller Jim Roberts because the seller sold the item to another customer sometime after the current user added the item to the shopping cart displayed in user interface 800. In response to the determination that seller 811 has sold the item, the item selection server has determined an alternative seller 814, "City Books," which has the same item 810 for sale. The alternative seller 814 may be selected by the item selection server 120, for example, because the alternative seller 814 has a greater feedback score than the previously selected seller 811, and/or the alternative seller 814 is offering the item 810 at a lower cost than the previously selected seller 811. In some embodiments, the alternative seller 814 may generally be the seller that the item selection server determines to be the best or most desirable seller of the item 810 based on criteria that may include one or more of seller feedback scores, geographic proximity of the seller to the customer, item price, shipping and handling costs, previous purchase or browsing history of the customer (such as whether the customer has previously bought an item from the seller), etc. By selecting "switch" option 816, the user may add the item 810 as offered for sale from seller 814 to the user's shopping cart, replacing item 810 as previously offered for sale by seller 811.

Figure 9:
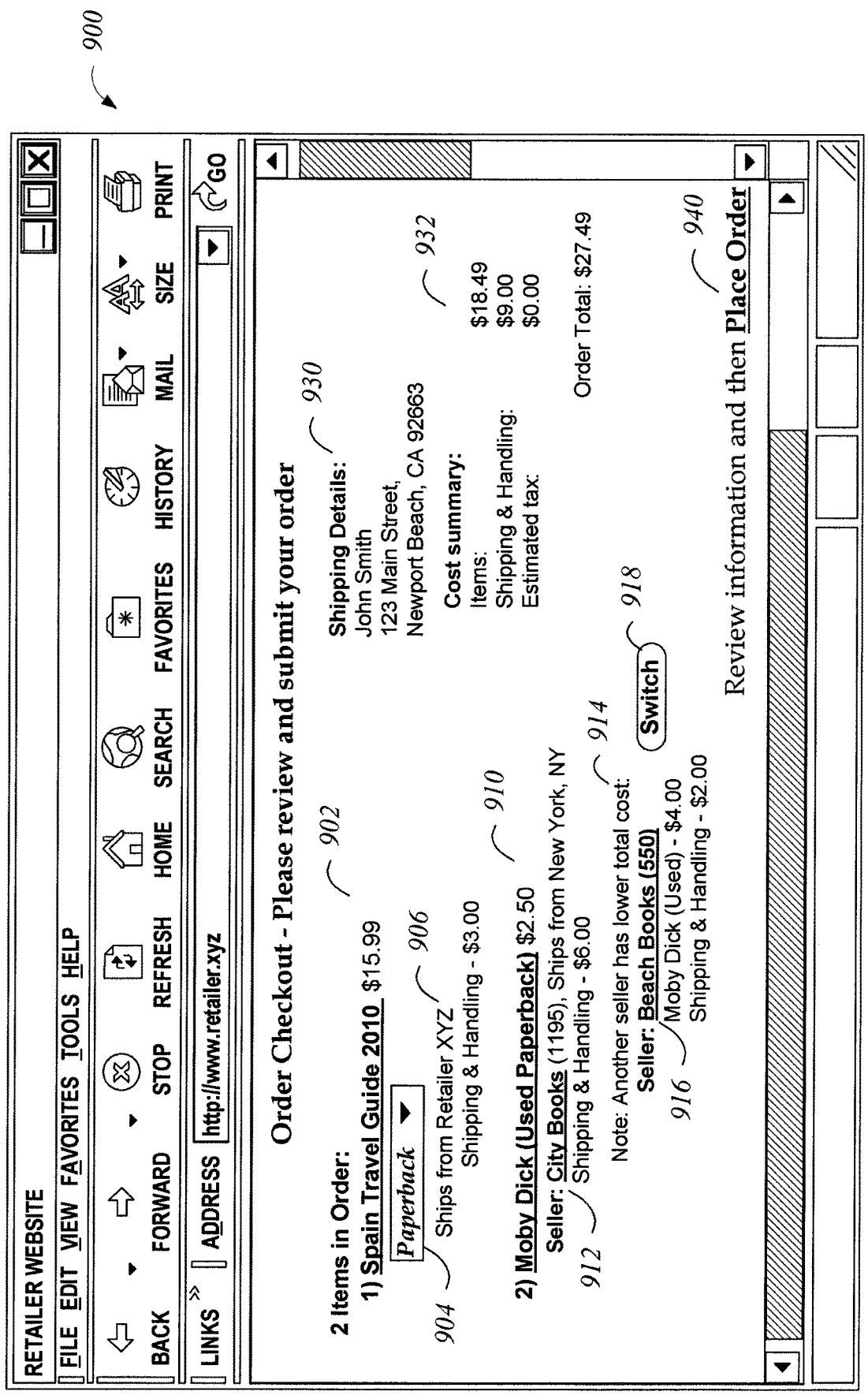
FIG. 9 is an illustrative user interface generated by the item selection server and/or retail server that includes items of an order that has not yet been placed or finalized by the user.

FIG. 9 is an illustrative user interface 900 generated by the item selection server 120 and/or retail server 110 that includes items 902 and 910 of an order that has not yet been placed or finalized by the user. In some embodiments, user interface 900 may be considered an example of an "order checkout" user interface. The illustrative user interface may have been generated as a result of a user selecting an option to "proceed to checkout," or otherwise continue the order process, from a user interface that displays the contents of the user's shopping cart. For example, the user may have proceeded to checkout after selecting "switch" options 806 and 816 displayed in user interface 800, discussed above in reference to FIG. 8. User interface 900 includes shipping address 930 indicating the address to which the order will ship, which may have been submitted by the user in a previously generated user interface or retrieved by retail server 110 from a data store that stores account information associated with the user. The illustrative user interface also includes a cost summary 932, including shipping and handling charges which may have been calculated by the retail server 110 based in part on the shipping address 930 and various attributes of the items of the order.

As illustrated in user interface 900, the order contains two items, item 902 and item 910. Item 902 is currently associated with the item attribute value of "paperback" (which may be, for example, one of many potential attribute values for a "format" item attribute of the book item 902). The user may change the item attribute value from within the order checkout user interface 900 by selecting a different format from menu option 904. As indicated by text 906, item 902 ships from "Retailer XYZ," which may be, for example, the operator of retail server 110. Item 910 is indicated as shipping from seller 912, "City Books," which will ship the item from New York with a shipping and handling fee of $6. In some embodiments, the shipping and handling fee may have been determined by the retail server 110 and/or item selection server 120 based on the shipping address 930 associated with the customer, and/or shipping and handling information previously submitted to retail server 110 by seller 912.

As indicated by text 914, the item selection server 120 has determined that item 910 is available from another seller at a lower total cost. The total cost from each available seller may be determined, for example, based on determining a sum of the price at which the seller has offered the item, the shipping and handling cost associated with shipping the item from the seller to the customer's shipping address 930, and any applicable taxes. As shown, the item selection server has determined that alternative seller 916, "Beach Books," is able to ship the item to the customer at a lower total cost than previously selected seller 912. For example, the user may have previously selected seller 912 because seller 912 offered the item at a lower item cost than seller 916 ($2.50 instead of $4.00), but the item selection server has determined that the lower shipping and handling cost associated with seller 916 more than makes up for the greater item cost associated with seller 916. The lower shipping and handling cost associated with seller 916 may be, for example, a result of seller 916 being located geographically closer to the shipping address 930. The user may switch the seller of item 910 to alternative seller 916 by selecting "switch" option 918. User selection of switch option 918 may result, in some embodiments, in user interface 900 being selectively updated by item selection server 120 or retail server 110 to include revised cost summary data associated with the revised order. Once the user has made any changes desired to the item attribute values and/or seller information associated with items 902 and/or 910, the user may select "place order" option 940 to finalize or submit the order.

As illustrated in FIG. 9, the selected seller 912 and the customer's shipping address 930 are both located in the same country. In some embodiments, if the item selection server 120 and/or retail server 110 determines that a selected seller does not ship items to a given location (such as a given country) associated with the customer's shipping address, the retail server 110 may present a user interface that includes a selectable option (not illustrated) listing one or more sellers that will ship the given item to the country or region associated with the customer's shipping address. The user may select such an option in order to switch sellers in a manner similar to that discussed above in reference to switch option 918.

Figure 10:
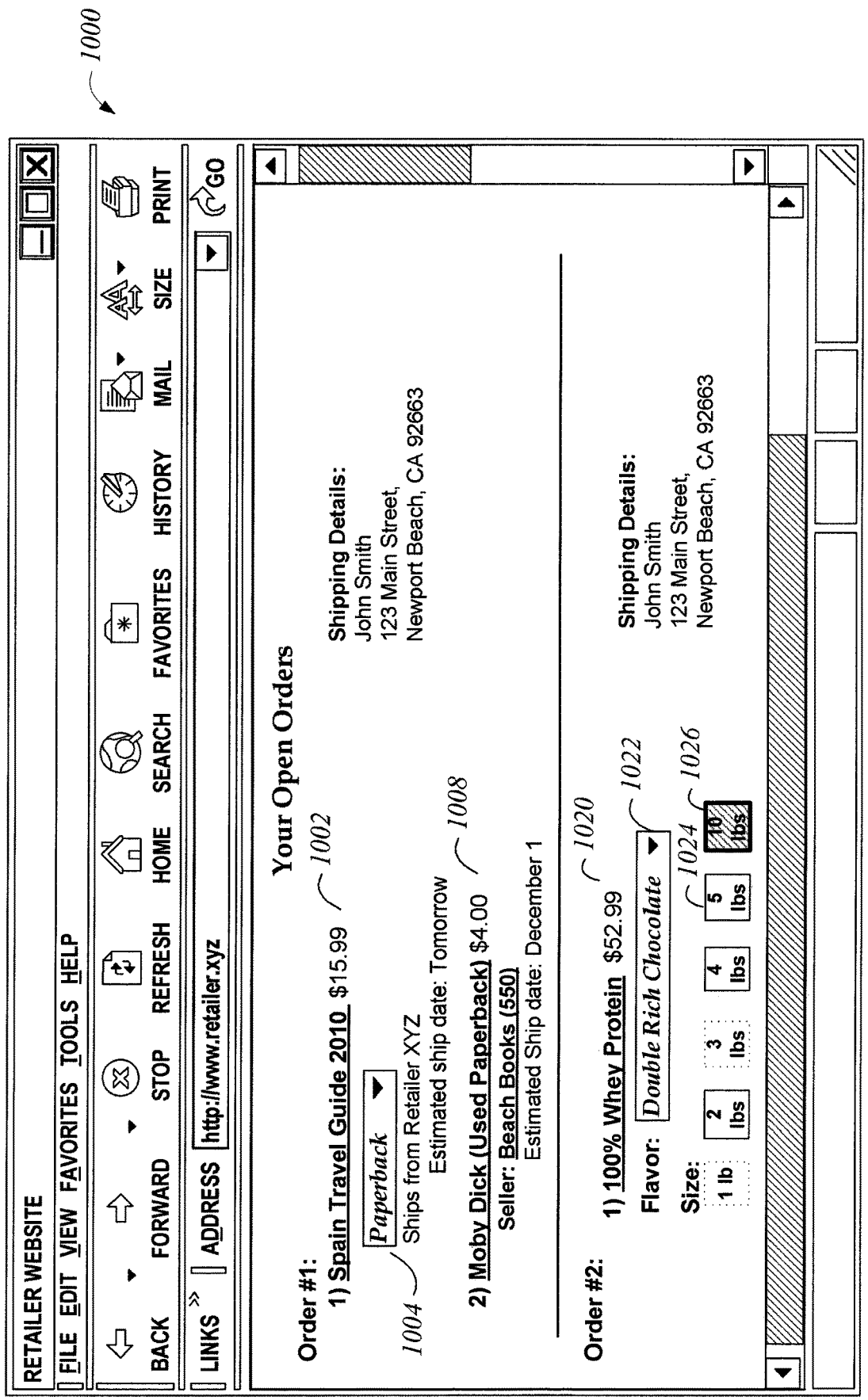
FIG. 10 is an illustrative user interface generated by the item selection server and/or retail server that includes order details of two orders placed by a user which have not yet shipped.

FIG. 10 is an illustrative user interface 1000 generated by the item selection server 120 and/or retail server 110 that includes order details of two orders placed by a user which have not yet shipped. In some embodiments, user interface 1000 may be considered an example of an "open orders" user interface. The illustrative user interface includes details of a first order that includes items 1002 and 1008, as well as details of a second order that includes item 1020. These orders may have each been placed by a user who has requested to view a listing of all open orders associated with the user's account, where an "open order" refers to an order that the user has placed and finalized, but which the retailer or other seller has not yet shipped. In some embodiments, the user may change one or more item attribute values associated with an item of an order from within user interface 1000 without canceling the order. For example, the user may select book format option 1004 to change the format of item 1002 from "paperback" to another attribute value, such as "hardcover." As another example, the user may select flavor option 1022 to change the attribute value associated with the flavor attribute of item 1020, and/or select size option 1024 to switch from the current "10 lbs" size selection 1026 to the "5 lbs" size attribute value. Certain item attribute value changes may change the total cost of an order, in which case the user may be presented, in some embodiments, with one or more additional user interfaces or selectively updated user interface portions that enable the user to confirm the cost changes. In some embodiments, the retail server 110 may enable a retailer or seller to set a time at which the user may no longer modify attribute values of items in an open order, such as the time at which an item has been processed or packaged for shipment.

While certain selectable item attribute options are discussed above in reference to the order checkout user interface 900 of FIG. 9 and the open orders user interface 1000 of FIG. 10, the item selection server 120 may present a variety of other selectable item attributes in an order checkout user interface and/or an open orders user interface, including but not limited to those examples discussed above with reference to the shopping cart user interfaces illustrated in FIGS. 4-8.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An electronic shopping cart system comprising:
a data store that stores data associated with a plurality of items available for purchase, wherein each of the plurality of items is associated with one or more item attributes, each item attribute associated with one or more item attribute values; and
a computing device in communication with the data store that is configured to:
generate for display one or more user interfaces that present item information associated with an item available for purchase, wherein the item information comprises one or more item attributes, each item attribute associated with an item attribute value;
receive, from a user device, a selection of an item, wherein the selection of the item corresponds to a user request to add the item to an electronic shopping cart comprising one or more items, and wherein a first item attribute associated with the item is assigned an item attribute value selected by the user;
add the item to the electronic shopping cart for potential purchase by the user;
subsequent to the item being added to the electronic shopping cart and prior to a purchase by the user of the one or more items in the electronic shopping cart, determine a suggested alternative attribute value for the first item attribute associated with the item, wherein the suggested alternative attribute value is determined based at least in part by:
determining that the user has previously purchased a prior item that was assigned a different item attribute value for the first item attribute than the item attribute value assigned for the item in the electronic shopping cart, wherein the prior item is different than the item in the electronic shopping cart; and
selecting the different item attribute value that was assigned for the prior item as the suggested alternative attribute value for the item in the electronic shopping cart;
receive, from the user device, a request to view information associated with the one or more items included in the electronic shopping cart;
in response to the request, generate for display a user interface that includes item information associated with each of the one or more items included in the electronic shopping cart, wherein the user interface includes one or more controls that enable the user to change the item attribute value assigned to the first item attribute of the item included in the electronic shopping cart to the suggested alternative attribute value from within the user interface, and wherein changing the item attribute value assigned to the first item attribute comprises selecting a different variation of the item without changing the quantity of items included in the electronic shopping cart;
receive, from the user device, a selection of the suggested alternative attribute value via user interaction with the one or more controls; and
without removing the item from the electronic shopping cart and without causing the user device to display a different user interface, change the item attribute value assigned to the first item attribute of the item to be the suggested alternative attribute value.

2. The electronic shopping cart system of claim 1, wherein the one or more controls enable the user to change the item attribute value assigned to the first item attribute of the item without removing the item from the electronic shopping cart.

3. The electronic shopping cart system of claim 1, wherein the user interface includes information identifying the determined alternative attribute value.

4. A system comprising:
a data store that stores data associated with a plurality of items available for purchase; and
a server computing device in communication with the data store that is configured to:
receive, from a user computing device, a selection of an item, wherein the selection of the item corresponds to a user request to add the item to an order of one or more items, and wherein a first item attribute associated with the item is assigned an item attribute value selected by the user;

add the item to the order;

determine a suggested alternative attribute value for the first item attribute associated with the item, wherein the suggested alternative attribute value is determined based at least in part on a determination that an item previously purchased by the user in a different order was assigned an attribute value for the first item attribute that is different than the attribute value selected by the user for the item, wherein the suggested alternative attribute value is set to be the attribute value that was assigned for the item previously purchased by the user;

receive, from the user device, a request to view information associated with the one or more items of the order;

in response to the request, generate for display a user interface that includes item information associated with each of the one or more items of the order, wherein the user interface includes one or more controls that enable the user to select a different variation of the item of the order by changing an item attribute value assigned to the first item attribute of the item of the order to the suggested alternative attribute value from within the user interface;

receive, from the user device, a selection of the suggested alternative attribute value; and without removing the item from the order and without causing the user device to display a different user interface, change the item attribute value assigned to the first item attribute of the item of the order to be the suggested alternative attribute value.

5. The system of claim 4, wherein the one or more controls enable the user to change a second item attribute value associated with the item without removing the item from the order.

6. The system of claim 4, wherein one of the one or more controls enables the user to change an item attribute value associated with each of a plurality of items included in the order.

7. The system of claim 4, wherein the suggested alternative attribute value is an item attribute value that the user has previously selected for a previously purchased item that is associated with an item category associated with the item.

8. The system of claim 4, wherein the suggested alternative attribute value is further based at least in part on user preferences associated with the user.

9. The system of claim 4, wherein the one or more controls enable the user to select a different variation of the item without generating any additional user interfaces.

10. The system of claim 4, wherein the computing device is further configured to:

determine that at least one item of the one or more items included in the order is not available for purchase; and generate for display a user interface that includes one or more controls that enable the user to change an item attribute value associated with the unavailable item to an item attribute value that corresponds to an item available for purchase.

11. The system of claim 10, wherein the at least one item was available for purchase at the time it was added to the order, and wherein the suggested alternative attribute value is determined in response to the determination that the at least one item is not available for purchase.

12. The system of claim 4, wherein the first item attribute is one of: a seller, a size, a color, a capacity, or a format.

\* \* \* \* \*